US012720270B2

(12) United States Patent
Sen et al.

(10) Patent No.: US 12,720,270 B2
(45) Date of Patent: Aug. 25, 2026

(54) MASKING ZONE IN METADATA FOR SPATIAL AUDIO RENDERING

(71) Applicant: Apple Inc., Cupertino, CA (US)

(72) Inventors: Dipanjan Sen, Dublin, CA (US); Moo Young Kim, San Diego, CA (US); Francois Becker, Antony (FR); Sang Uk Ryu, San Diego, CA (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 18/671,861

(22) Filed: May 22, 2024

(65) Prior Publication Data

US 2024/0406656 A1 Dec. 5, 2024

Related U.S. Application Data

(60) Provisional application No. 63/506,037, filed on Jun. 2, 2023.

(51) Int. Cl.

*H04R 5/02* (2006.01)
*G10L 19/008* (2013.01)
*H04S 7/00* (2006.01)

(52) U.S. Cl.

CPC ............ *H04S 7/302* (2013.01); *G10L 19/008* (2013.01); *H04S 2400/11* (2013.01); *H04S 2400/13* (2013.01); *H04S 2420/11* (2013.01)

(58) Field of Classification Search

CPC .. H04S 7/302; H04S 2400/11; H04S 2400/13; G10L 19/008
USPC .................................................. 381/303, 300
See application file for complete search history.

(56) References Cited

U.S. PATENT DOCUMENTS

| | | | |
|---|---|---|---|
| 2014/0348342 A1 | 11/2014 | Laaksonen et al. | |
| 2016/0379660 A1 | 12/2016 | Wright et al. | |
| 2021/0004200 A1 | 1/2021 | Swaminathan et al. | |
| 2021/0004452 A1* | 1/2021 | Swaminathan | G06F 3/165 |
| 2021/0157978 A1 | 5/2021 | Haramati et al. | |
| 2021/0304777 A1 | 9/2021 | Kim et al. | |
| 2025/0193626 A1* | 6/2025 | Canberk | H04S 7/303 |

FOREIGN PATENT DOCUMENTS

WO 2021084004 A1 5/2021

OTHER PUBLICATIONS

EBU, "Technical Review, Scene-Based Audio and Higher Order Ambisonics: a Technology Overview and Application to Next-Generation Audio, VR and 360 Video", received from https://knowledgehub.ebu.ch/files/live/sites/tech/files/shared/techreview/trev_2019-Q4_SBA_HOA_Technology_Overview.pdf, Nov. 2019, 28 pages.

EBU, "ZoneExclusion", received from https://adm.ebu.io/reference/adm_elements/parameters/zone_exclusion.html, 2023, 1 page.

(Continued)

*Primary Examiner* — Ammar T Hamid

(74) *Attorney, Agent, or Firm* — Aikin & Gallant, LLP

(57) ABSTRACT

The various aspects of the disclosure here enable a content creation side to control how a sound program is spatial audio rendered by a decoding side, so that an audio scene component in a metadata-specified three dimensional acoustic masking zone is not heard while another audio scene component in an un-masked zone of the sound program is heard by a listener of the playback. Other aspects are also described and claimed.

18 Claims, 3 Drawing Sheets

(56) References Cited

OTHER PUBLICATIONS

GB2407782.8, “Combined Search and Rxamination Report under Section 17 and 18(3)”, mailed Dec. 2, 2024, 8 pages.
GB2407782.8, “UK Examination Report Under Section 18(3)”, mailed Jan. 16, 2026, 8 pages.

* cited by examiner

MASKING ZONE IN METADATA FOR SPATIAL AUDIO RENDERING

This nonprovisional patent application claims the benefit of the earlier filing date of U.S. provisional application No. 63/506,037 file Jun. 2, 2023.

FIELD

An aspect of the disclosure here relates to spatial audio rendering of a sound program by a decoder side process, in accordance with metadata associated with the sound program, where the metadata is provided by a process executing in a content creation side. Other aspects are also described.

BACKGROUND

A sound program can be produced as a live recording such as a recording of a concert or a sporting event (with or without accompanying video), or it can be previously recorded or previously authored, e.g., using a software application development platform for instance as the soundtrack of a segment of a video game. In all cases, the sound program may be tuned in the content creation side, using digital signal processing, to the taste of a content creator (e.g., a person working as an audio mixer.) The tuned sound program may then be encoded for bitrate reduction before being delivered to a listener's playback device, for instance over the Internet. At the playback device, or in the decoding side, the sound program is decoded and then rendered into speaker driver signals that are appropriate to the listener's sound subsystem (e.g., headphones, a surround sound loudspeaker arrangement.)

A sound program may be digitally processed by a spatial audio renderer, so that the resulting speaker driver signals produce a listening experience in which the listener perceives the program closer to how they would hear a scene if they were present in the scene that is being recorded or synthesized. The spatial audio renderer would enable the listener to for example perceive the sound of a bird chirping as coming from a few meters to their right, and another animal rustling through leaves on the ground a few meters to their left, or the sound of the wind blowing against the trees as being all around them.

SUMMARY

A content creator may decide to craft a sound program so that it carries with it the content creator's wishes for how a particular scene should be heard. For example, the creator may wish to have the voice of a particular person in the scene that is being recorded to be muffled or muted, so that for example sensitive speech by the person will not be heard by listeners. This may for example be the voices of a coach and a player who are huddling during a sporting event, to discuss confidential game strategy. The various aspects of the disclosure here enable the content creation side to instruct the decoding side via metadata of the sound program, to attenuate or even omit from playback any discrete audio objects in the sound program that might be positioned in a metadata-specified, masking zone (e.g., a three dimensional zone or a three dimensional acoustic zone), when the sound program is being spatial audio rendered for playback by the decoding side.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
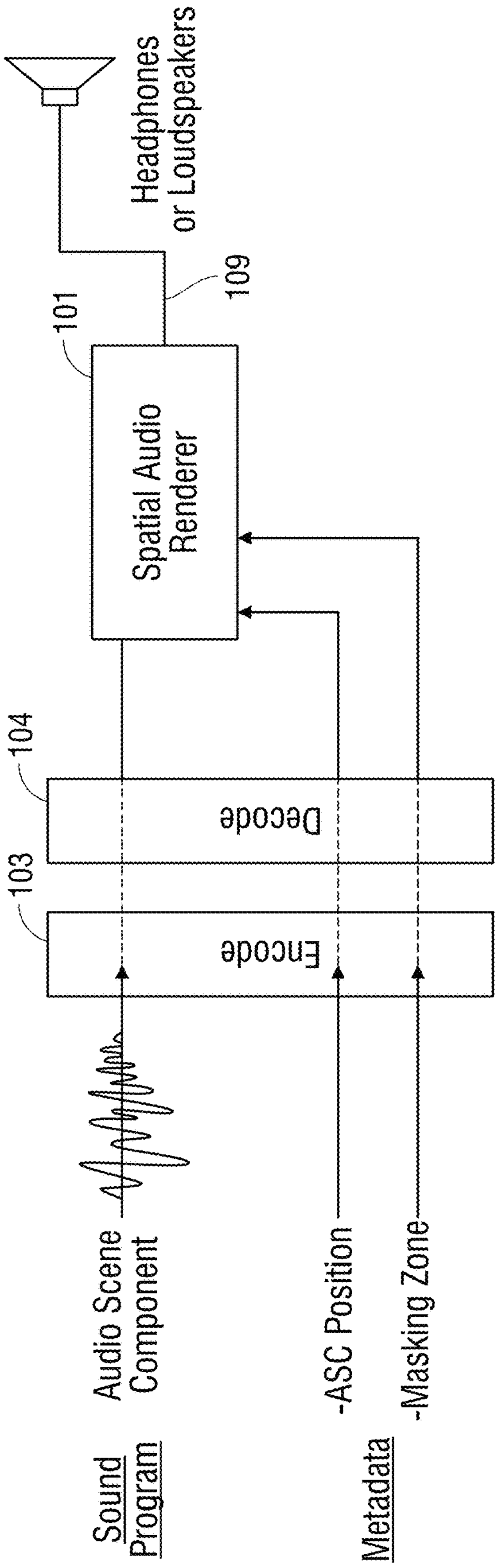
FIG. 1 is a block diagram of encoding side and decoding side processes for spatial audio rendering using metadata that specifies a masking zone.

Referring to FIG. 1, this is a block diagram of example digital processes being executed in an encoding side and in a decoding side for spatial audio rendering using metadata. In the encoding side, a sound program is obtained (e.g., from a content creation side) that contains at least one audio scene component which may be in any one of several different formats. For instance, it may be composed of one or more audio stems, or one or more audio objects including, for example, a group of two or more objects, where each object or stem is an audio signal, e.g., a pulse code modulated, PCM, audio signal. Alternatively, the sound program (or its audio scene components) may be in the form of channels (e.g., 5.1 surround format, or 7.1.4 surround format), or in the form of Higher Order Ambisonics (HOA.) The sound program may also be in a mixed scene format, e.g., where the sound field includes audio scene components that are not only audio objects but also channels and an HOA representation. While the techniques described below are in the context of objects, those techniques are also applicable when the sound program is or contains a segment that has a multi-channel format, and they are also applicable to a segment of the sound program that is in an HOA representation.

The sound program may contain dialog such as the separate voices of one or more actors in a play or in a soundtrack of a movie having dialog, music, and effects stems, for example. The sound program may be a live recording (being recorded in real time), e.g., of a sporting event, a concert, an on-location news report, etc. Alternatively, it may be a previously recorded or previously authored music or audio visual work, for example using a software development kit, e.g., a video game or a movie. It may also be a combination of a live recording and a synthesized work such as a mixed reality work.

The sound program (audio scene components) is encoded into a bitstream by an encode process (encode 103), for purposes of bitrate reduction, and is associated with metadata. The metadata may contain spatial descriptors about certain audio scene components. A single audio scene component (ASC) may be in the form of an audio object (or has an object representation), an HOA representation, or channel-based audio. The spatial descriptors may indicate a position of the object as a virtual sound source relative to an origin or reference that may represent a listening position or a screen or display on which video associated with the sound program is being simultaneously rendered. The position of the object may be given in, for example, polar coordinates which include its distance from the origin, its azimuth angle, and its elevation angle. The metadata may also be encoded for bitrate reduction. The metadata may be provided to the decoding side via a separate communication channel, or it may be incorporated into the bitstream along with the sound program as shown in the example of FIG. 1.

In the decoding side, the encoded sound program and the metadata are provided to or obtained by a playback device, e.g., in a bitstream over the Internet. The playback device may be for instance a digital media player in a console, a smartphone, a tablet computer, etc. One or more decoding side processes are performed by a programmed processor in the playback device (that may have been configured in accordance with instructions stored in a non-transitory machine readable medium such as solid state memory.) One of the decoding side processes (decode 104) serves to undo the encoding to recover the ASCs that make up the sound program, and to extract the metadata which contains the masking zone.

The decoding side also includes a spatial audio renderer 101 which performs a spatial audio rendering process that produces speaker driver signals 109 suitable for the listener's sound subsystem which may be depicted in the figures here by a speaker symbol. The speaker driver signals 109 may be binaural headphone signals, or they may be loudspeaker driver signals for a particular type of surround sound subsystem. The spatial audio renderer does so by converting the ASCs that make up the sound program into the speaker driver signals using any suitable spatial audio rendering algorithm. This conversion may take place by first converting decoded audio objects into higher order ambisonics, HOA, format and then converting the HOA format into the speaker driver signals. Alternatively, the decoded audio objects may be converted directly into the channel format of the sound subsystem. The speaker driver signals will then drive the sound subsystem, which reproduces the sound program.

Figure 2:
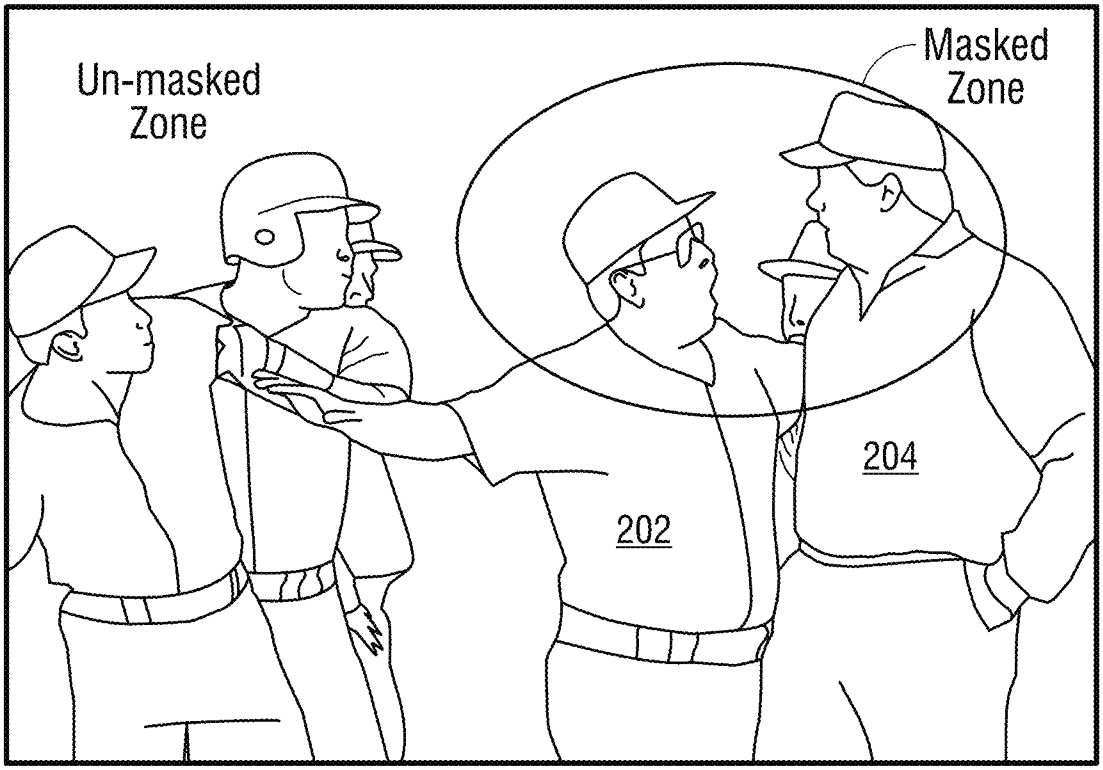
FIG. 2 illustrates an example of a masking zone.

In one aspect of the disclosure here, the metadata specifies a three dimensional masking zone of the sound program, and instructs a process in the decoding side, the spatial audio renderer 101, to attenuate the sound program (while the process is spatial audio rendering the sound program for playback) whenever there is an ASC that is in the masking zone. This results in any ASC that is in the masking zone to not be heard during a playback session, by a user or listener of the sound subsystem, while another ASC that is in an un-masked zone of the sound program is heard by the listener during the playback session. In FIG. 2 which depicts an example playback where the sound program is the soundtrack of a live recording or live broadcast of a sporting event, the content creator has selected the masking zone to be restricted to where a coach (element 202) and an umpire or referee (element 204) have come face to face and are arguing; colorful language is being exchanged, to which certain viewers/listeners of the sound program may be sensitive.

In one aspect, the decoding side process compares the 3D positions (within the sound scene) of one or more ASCs (e.g., audio objects) to the masking zone indicated in the metadata. The positions of the audio objects would be found in the metadata. In the example of FIG. 2, the result could be that one or two audio objects that represent the voices of the coach and the umpire will be found to be positioned within the masking zone, and as such they will be sufficiently attenuated or simply omitted so as not to be heard during the playback. At the same time, the voice of the crowd or the voice of the competitors that are visible in the same scene are outside the masking zone (or are located in an un-masked zone)

If the sound program is created in or has a segment that is in HOA format or has an HOA representation, then based on the masking zone specified in the metadata, digital signal processing-based sound field processing techniques are performed in the decoding side that modify the HOA representation by attenuating (e.g., nulling out) the metadata-specified masking zone of the sound scene (while not attenuating nearby zones that are not masked.) This may be achieved by beamforming techniques using spherical harmonics to attenuate (e.g., null out) the sound energy for the area specified by the masking zone. In the example of FIG. 2, the result should be that the HOA-based sound field processing technique attenuates only the voices of the umpire and the coach enough and does so enough so that the listener cannot hear those voices.

If the sound program is created in or has a segment that is in a multi-channel surround format for instance, then sound field analysis is performed by the decoding side to attenuate or even null out the specified masking zone, for example by first converting the multi-channel surround format to HOA.

In one instance, a variable AudioSceneMaskingZone in the metadata (see FIG. 1, masking zone) instructs the decoder side process to attenuate only those ASCs (e.g., channels, object, HOA) which, as specified in the metadata, are located in one or more masking zones.

In one aspect, a dictionary or codebook of pre-defined zones is created (and shared with the decoding side), so that the content creator only needs to select one or more of the pre-defined zones. For each possible pre-defined zone, there is an entry in the dictionary that contains the parameters or description of that zone. The metadata may include a switch or flag that specifies this, e.g., If usePreDefinedZones==1.) In that case the masking zone is specified in the metadata by just an index to its entry in the dictionary. The renderer on the decoding side has access to the dictionary and will in that case perform a table lookup in the dictionary to obtain the parameters or actual description of the selected masking zone. It then uses the parameters or description to determine which one or more ASCs are in the masking zone, and then attenuates or omits only those ASCs.

In another aspect, the content creator may specify an arbitrary masking zone in the metadata by inserting its description directly into the metadata, as a range of geometrical coordinates in 3D space, e.g., a range of Cartesian coordinates in 3D space or a range of Polar coordinates in 3D space.

In yet another aspect, the metadata may specify that the spatial audio renderer 101 must implement a transition zone to avoid abrupt gain changes between rendered ASCs that are in the masking zone and rendered ASCs that are not in the masking zone. The length of the transition zone (e.g., as a distance length) may be either sent in the metadata or it may be stored for example as a default in the spatial audio renderer 101. In one aspect, the transition zone is abutting the masking zone and is in between the masking zone and the unmasked zone, and the process in the decoding side performs a gain transition when rendering the sound program by applying a low gain or attenuation to the masking zone (e.g., maximum attenuation to null out all sound sources located in the masking zone), a gradual change of gain (e.g., an intermediate gain) in the transition zone, wherein the gradual change of gain (or intermediate gain) is greater than the low gain or attenuation, and a high gain to the unmasked zone, wherein the high gain is greater than the gradual change of gain (e.g., no attenuation.) Alternatively, the metadata could specify that a fade-in of an original ASC gain starts outside of the masking zone and the fade-in ends inside the masking zone.

Camera Positions

Figure 3:
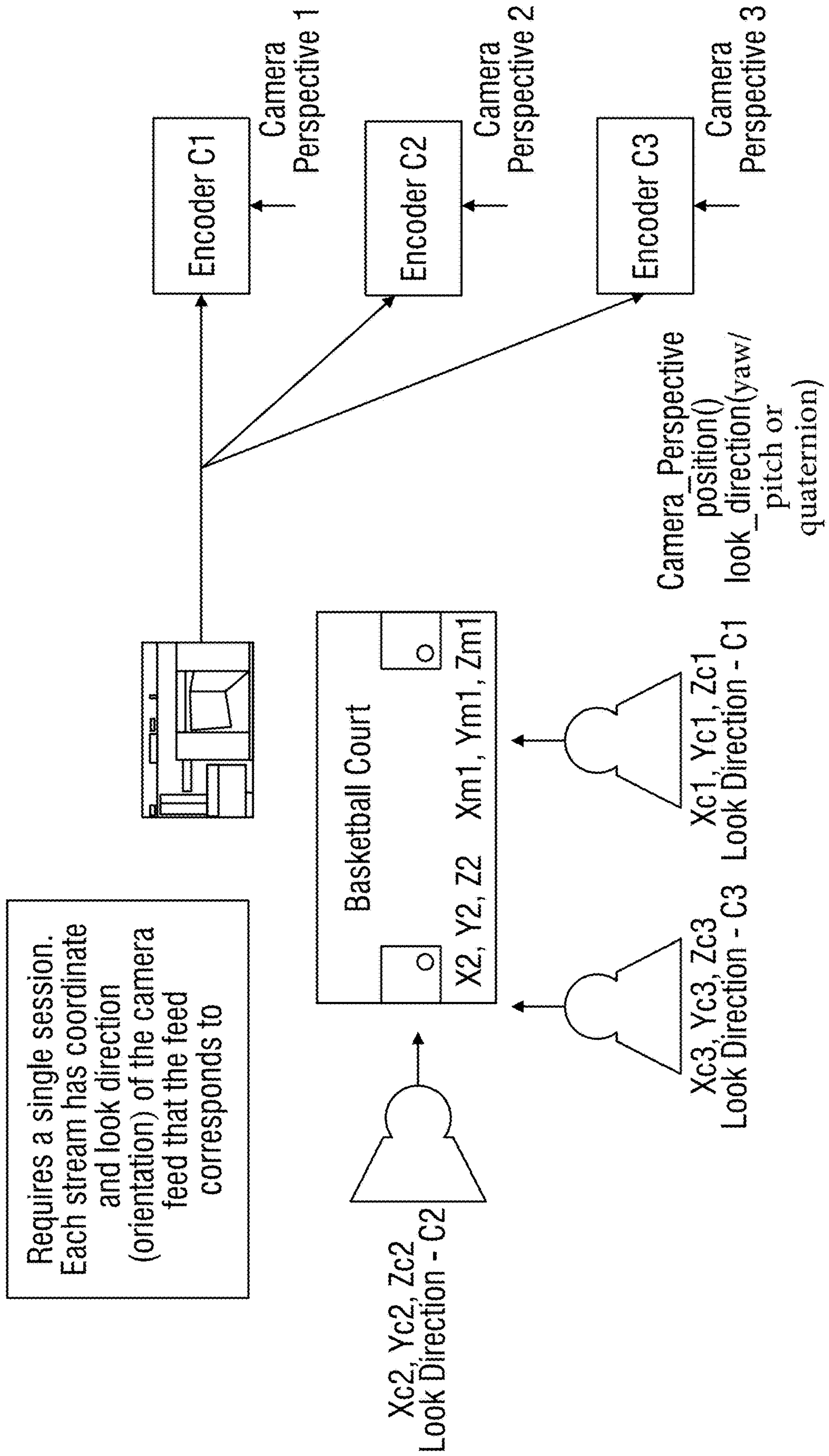
FIG. 3 shows an example of camera position and orientation of multiple feeds inserted into metadata of a captured scene video.

Turning now to FIG. 3, this figure illustrates an example of multiple cameras aimed at a scene, such as a live sporting event, in which camera position and orientation are inserted into metadata of the several captured scene video feeds. A single video feed referred to here as a reference feed is encoded and sent along with its metadata that includes audio objects/HOA and their respective positions relative to a reference camera. For all the other video feeds, the same audio session is used but only a relative position of the that feed's camera is sent, relative to the reference feed camera. In the decoding side, during playback, the spatial audio renderer will use repositioned objects/HOA for final rendering. The metadata also includes camera position and angle or orientation, e.g., in quaternions. This is contrasted to requiring a new audio session for each camera even though the positions of the objects remain the same.

Various aspects (masking zone, camera positions) described herein may be embodied, at least in part, in software. That is, the techniques method operations described above and recited below in the claims may be carried out in an audio processing system in response to or by its processor executing instructions contained in a storage medium, such as a non-transitory machine-readable storage medium (e.g., dynamic random access memory, static memory, non-volatile memory). Note the phrase "a processor" is used generically here to refer to one or more processors that may be in separate housings or devices and that may be in communication with each other, for example forming in effect a distributed computing system. Also, in various aspects, hardwired circuitry may be used in combination with software instructions to implement the techniques described herein. Thus, the techniques are not limited to any specific combination of hardware circuitry and software, or to any source for the instructions executed by the audio processing system.

In the description, certain terminology is used to describe features of various aspects. For example, in certain situations, the terms "module", "processor", "unit", "renderer", "system", "device", "filter", "engine", "block," "detector," "simulation," "model," and "component", are representative of hardware and/or software configured to perform one or more processes or functions. For instance, examples of "hardware" include, but are not limited or restricted to, an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to convey the substance of their work most effectively to others skilled in the art. An algorithm is here, and, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined, or removed, performed in parallel or in serial, as desired, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination of hardware devices and software components.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the claim.

It is well understood that the use of personally identifiable information should follow privacy policies and practices that are recognized as meeting or exceeding industry or governmental requirements for maintaining the privacy of users. Personally identifiable information data should be managed and handled to minimize risks of unintentional or unauthorized access or use, and the nature of authorized use should be clearly indicated to users.

What is claimed is:

1. A method performed in a decoding side for spatial audio rendering using metadata, the method comprising:

decoding a sound program from a bitstream; and receiving metadata of the sound program, wherein the metadata specifies a masking zone and instructs a process on whether to attenuate the sound program while the process is spatial audio rendering the sound program for playback so that one or more audio scene components of the sound program that are located in the masking zone are not heard while one or more other audio scene components of the sound program that are located outside the masking zone in an un-masked zone are heard by a listener of the playback, wherein the metadata further specifies a transition zone that abuts the masking zone and is in between the masking zone and the un-masked zone, the process to perform a gain transition when rendering the sound program by applying a low gain to the masking zone, an intermediate gain to the transition zone, wherein the intermediate gain is greater than the low gain, and a high gain to the un-masked zone, wherein the high gain is greater than the intermediate gain.

2. The method of claim 1 wherein the one or more audio scene components of the sound program that are located in the masking zone are in a higher order ambisonics representation, an HOA representation, the method further comprising:

in response to the metadata, processing the HOA representation using a sound field processing technique that modifies the HOA representation by attenuating sound energy in the masking zone in the HOA representation.

3. The method of claim 1 wherein the one or more audio scene components of the sound program that are located in the masking zone is an audio object that has an associated 3D or 2D position given for it in the metadata, the method further comprising:

in response to the metadata, determining whether the audio object is in the masking zone and either omitting the audio object from the playback or attenuating the audio object so that the audio object can no longer be heard by the listener during the playback.

4. The method of claim 1 wherein the one or more audio scene components of the sound program that are located in the masking zone is a channel based audio representation, the method further comprising in response to the metadata, processing the channel based audio representation using a sound field processing technique that modifies the channel based audio representation by attenuating sound energy in the masking zone.

5. The method of claim 1 wherein the metadata specifies a country or a product market for the masking zone.

6. The method of claim 1 wherein the metadata specifies the masking zone as an index to a dictionary of pre-defined geometrical three dimensional zones, wherein the decoding side is to perform a lookup into the dictionary using the index to obtain one of the pre-defined geometrical three dimensional zones as the masking zone.

7. The method of claim 6 wherein each of the pre-defined geometrical three dimensional zones comprise a range of Cartesian coordinates in 3D space or a range of Polar coordinates in 3D space.

8. The method of claim 1 wherein the metadata specifies a distance length of the transition zone.

9. An article of manufacture comprising a non-transitory machine-readable having contained therein instructions that when executed by a processor:

receive a sound program decoded from a bitstream;

receive metadata of the sound program; and determine, in accordance with a masking zone specified in the metadata whether to attenuate the sound program while the sound program is being spatial audio rendered for a playback so that one or more audio scene components of the sound program that are located in the masking zone are not heard while one or more other audio scene components of the sound program that are located outside the masking zone in an un-masked zone are heard by a listener of the playback, wherein the metadata further specifies a transition zone that abuts the masking zone and is in between the masking zone and the un-masked zone, and the processor performs a gain transition when rendering the sound program for the playback by applying a low gain to the masking zone, an intermediate gain to the transition zone, wherein the intermediate gain is greater than the low gain, and a high gain to the un-masked zone, wherein the high gain is greater than the intermediate gain.

10. The article of manufacture of claim 9 wherein the metadata specifies the masking zone as an index to a dictionary of pre-defined geometrical three dimensional zones, and the instructions configure the processor to perform a lookup into the dictionary using the index to obtain one of the pre-defined geometrical three dimensional zones.

11. The article of manufacture of claim 9 wherein the metadata specifies the masking zone directly as a geometrical three dimensional zone comprising a range of Cartesian coordinates in 3D space or a range of Polar coordinates in 3D space.

12. An article of manufacture comprising:

a non-transitory machine-readable medium having therein metadata of a sound program, the metadata comprising:

a masking zone, wherein the metadata instructs a process on whether to attenuate the sound program while the process is spatial audio rendering the sound program for playback so that one or more audio scene components of the sound program that are located in the masking zone are not heard while one or more other audio scene components of the sound program that are located outside the masking zone in an un-masked zone are heard by a listener of the playback, wherein the metadata further specifies a transition zone that abuts the masking zone and is in between the masking zone and the un-masked zone, in response to which the process performs a gain transition when spatial audio rendering the sound program by applying a low gain to the masking zone, an intermediate gain to the transition zone, wherein the intermediate gain is greater than the low gain, and a high gain to the un-masked zone, wherein the high gain is greater than the intermediate gain.

13. The article of manufacture of claim 12 wherein the non-transitory machine-readable medium contains the sound program, and wherein the one or more audio scene components of the sound program that are located in the masking zone are in a higher order ambisonics representation, an HOA representation.

14. The article of manufacture of claim 12 wherein the non-transitory machine-readable medium contains the sound program, and wherein the one or more audio scene components of the sound program that are located in the masking zone is an audio object.

15. The article of manufacture of claim 12 wherein the non-transitory machine-readable medium contains the sound program, and wherein the one or more audio scene components of the sound program that are located in the masking zone is a channel based audio representation.

16. The article of manufacture of claim 12 wherein the metadata specifies a country or a product market for the masking zone.

17. The article of manufacture of claim 12 wherein the metadata specifies the masking zone as an index to a dictionary of pre-defined geometrical three dimensional zones, in response to which the process performs a lookup into the dictionary using the index to obtain one of the pre-defined geometrical three dimensional zones as the masking zone.

18. The article of manufacture of claim 17 wherein each of the pre-defined geometrical three dimensional zones comprise a range of Cartesian coordinates in 3D space or a range of Polar coordinates in 3D space.

* * * * *